W. HOGAN.
ANIMAL POKE.
APPLICATION FILED APR. 3, 1914.
1,112,289.
Patented Sept. 29, 1914.
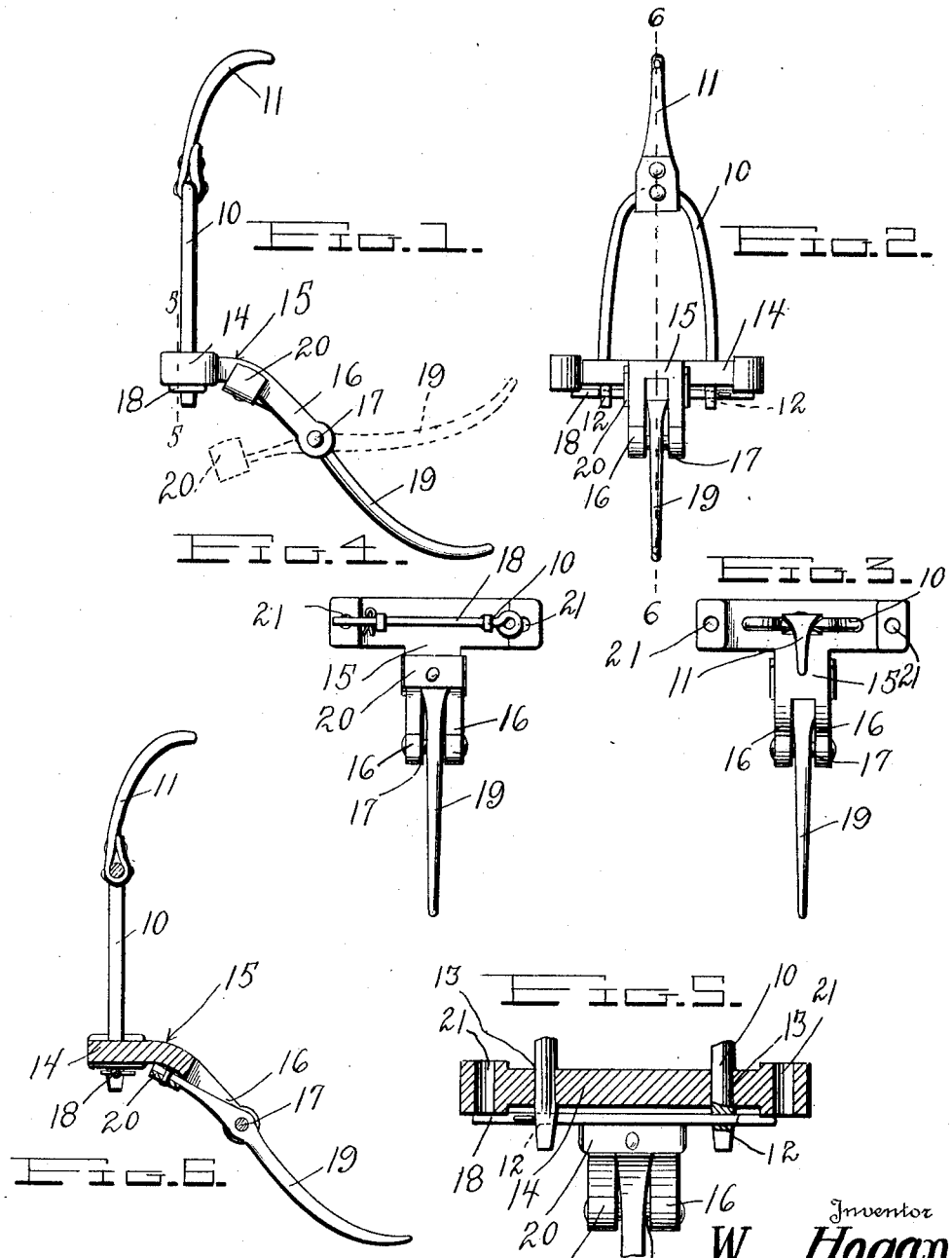

UNITED STATES PATENT OFFICE.

WILLIAM HOGAN, OF CORINTH, GEORGIA.

ANIMAL-POKE.

1,112,289.

Specification of Letters Patent. Patented Sept. 29, 1914.

Application filed April 3, 1914. Serial No. 829,271.

*To all whom it may concern:*

Be it known that I, WILLIAM HOGAN, a citizen of the United States, residing at Corinth, in the county of Heard, State of Georgia, have invented certain new and useful Improvements in Animal-Pokes; and I do hereby declare the following to be a full, clear, and exact description of the invention, such as will enable others skilled in the art to which it appertains to make and use the same.

This invention relates to improvements in animal pokes and has particular reference to an article of this nature designed for application to the necks of horses, cattle or other animals to prevent them from jumping over, or breaking through fences or other obstructions.

In carrying out the invention it is my purpose to provide a strong, simple and inexpensive device of this character that is wholly efficient in operation and may be readily applied to an animal's neck.

A further object of my invention is the provision of a poke in which one of the fence engaging elements is adapted to adjust itself with respect to the poke, to permit of free access to the feed while grazing, but which will quickly move to its operative position should the animal attempt to jump over a fence or other obstruction.

With these and other objects of similar nature in view, my invention consists in the construction, combination and arrangement of parts set forth in and falling within the scope of the appended claim.

In the accompanying drawing: Figure 1 is a side elevation of an animal poke constructed in accordance with my invention. Fig. 2 is a front elevation thereof. Fig. 3 is a top plan view. Fig. 4 is a bottom plan view. Fig. 5 is a vertical section on the line 5—5 of Fig. 1. Fig. 6 is a sectional view on the line 6—6 of Fig. 2.

Referring now to the accompanying drawing in which like characters of reference designate similar parts, the numeral 10 designates an inverted U-shaped yoke member, detachably secured to the bight portion of which is a forwardly extending hook member 11, the legs of the yoke member being slightly flattened and terminally provided with alined openings 12.

Formed with openings 13 to receive the leg portions of the yoke member 10, is a bridge piece 14, said bridge piece being provided with an outwardly and downwardly directed arm 15, the free end of which is bifurcated and formed with perforated ears 16 adapted to receive a pivot pin 17. For securing the bridge piece 14 on the yoke member 10, there is provided a pin 18, said pin being passed through the openings 12 in the legs of the yoke and held in position therein by a cotter pin or other suitable fastening means.

Pivotally mounted on the pin 17, is a second forwardly extending hook member 19, the upper end of said hook being provided with a U-shaped bracket 20 adapted to straddle the arm 15 at a point adjacent the bridge piece 14, for the purpose of supporting the hook member 19 in its operative position and limiting the downward movement thereof.

It may further be added that the openings 21 in the ends of the bridge piece 14 are adapted to receive a yoke of slightly larger size than that illustrated, to permit of application of the poke to animals of various sizes. This second yoke member will be arranged in and connected to the bridge piece 14 in a manner similar to that of the yoke member 10.

In operation the yoke 10 is placed about the animal's neck, the legs of the yoke being passed through the openings 13 in the bridge piece 14, and the pin 18 passed through the openings 12 in the ends of said legs to secure the parts in their relative position. The poke is now in its applied position, and should the animal attempt to jump over or break through a fence, one or the other of the hook members 11 and 19 will come into contact with the obstruction offered by the fence and thereby prevent its accomplishment. While the animal is grazing however, the pivotal mounting of the hook member 19 allows said member to adjust itself with respect to the poke to permit of free access to the feed, said hook returning to its normal or operative position when the animal's head is raised.

What is claimed, is:—

An animal poke comprising a U-shaped yoke member, a bridge piece detachably connected with the legs of said yoke, a laterally extending bifurcated arm carried by said bridge piece, a hook pivotally mounted in the bifurcated portion of said arm for relative movement with respect thereto, and a substantially U-shaped supporting member carried at the upper end of said hook and adapted to embrace said laterally extending arm to limit the movement of said hook in one direction.

In testimony whereof, I affix my signature, in the presence of two witnesses.

WILLIAM HOGAN.

Witnesses:
 BENJAMIN A. HOGAN,
 JOHN W. SMITH.

---

Copies of this patent may be obtained for five cents each, by addressing the "Commissioner of Patents, Washington, D. C."